Aug. 12, 1952     R. A. M. RONCERAY     2,606,348
MOLD FOR THE FABRICATION OF METALLIC CHAINS
Filed May 16, 1949                              5 Sheets-Sheet 1
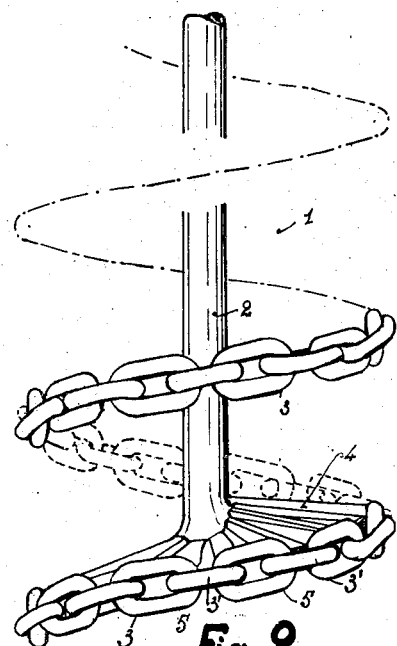
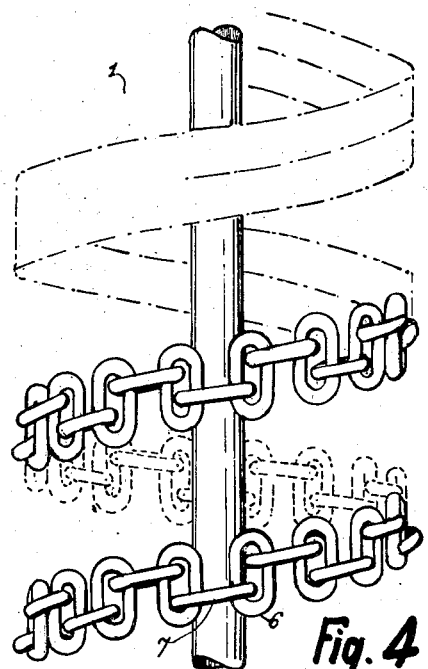
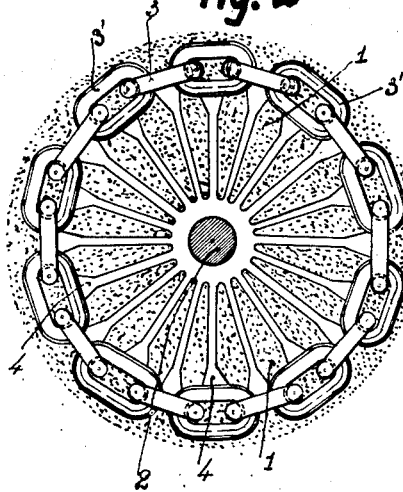
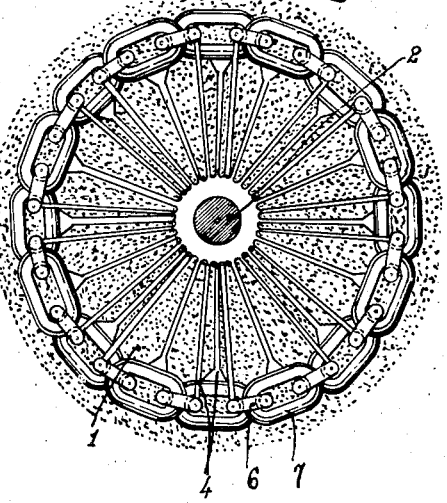
INVENTOR
ROBERT ANDRE MARCEL RONCERAY
By Linton and Linton
ATTORNEYS Aug. 12, 1952 — R. A. M. RONCERAY — 2,606,348
MOLD FOR THE FABRICATION OF METALLIC CHAINS
Filed May 16, 1949 — 5 Sheets-Sheet 2
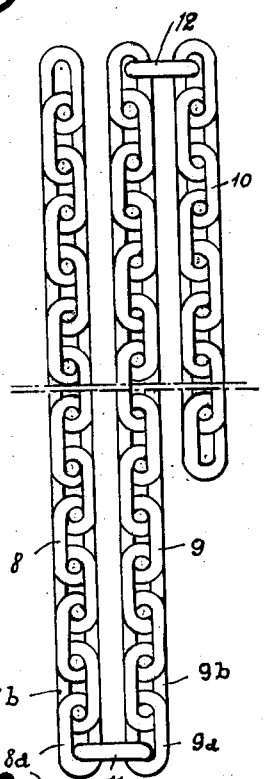
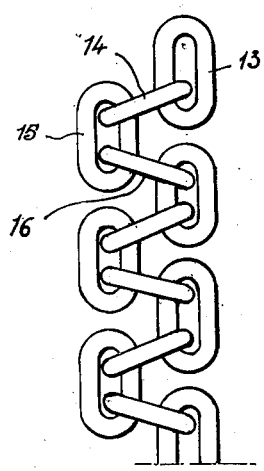
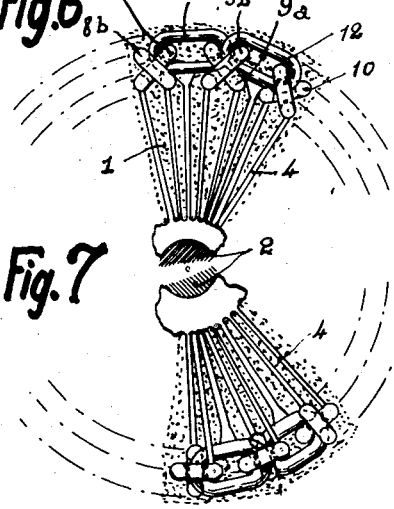
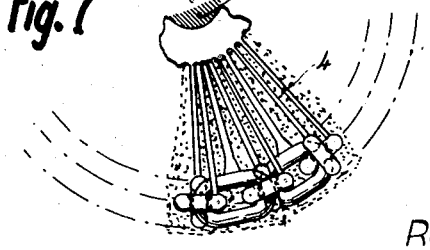
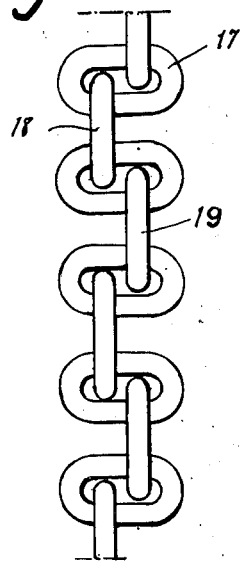
INVENTOR
ROBERT ANDRÉ MARCEL RONCERAY
By Linton and Linton
ATTORNEYS Aug. 12, 1952         R. A. M. RONCERAY         2,606,348
MOLD FOR THE FABRICATION OF METALLIC CHAINS
Filed May 16, 1949                        5 Sheets-Sheet 3
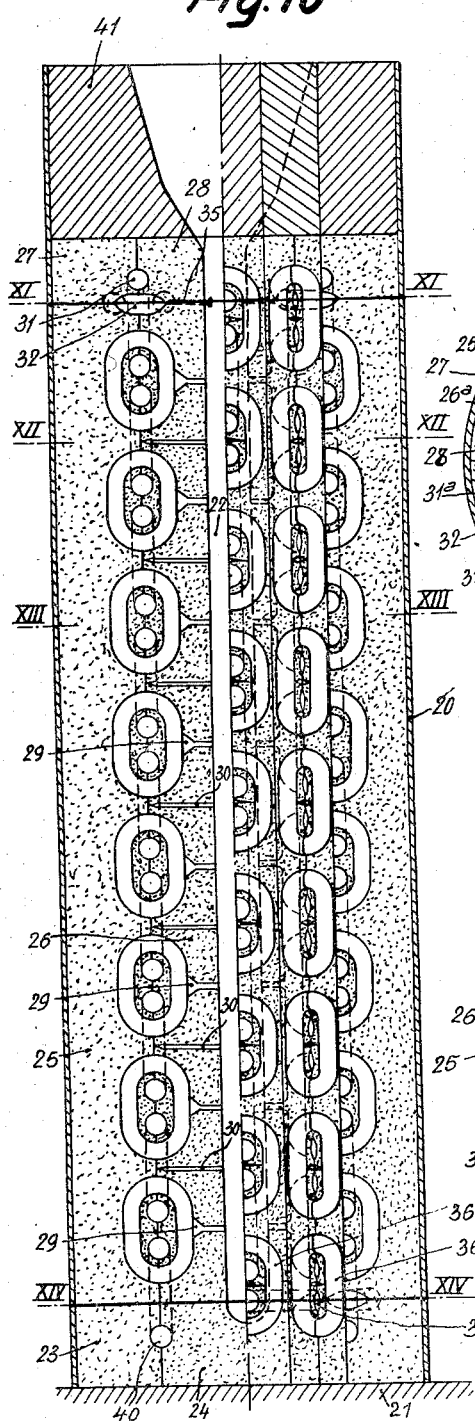
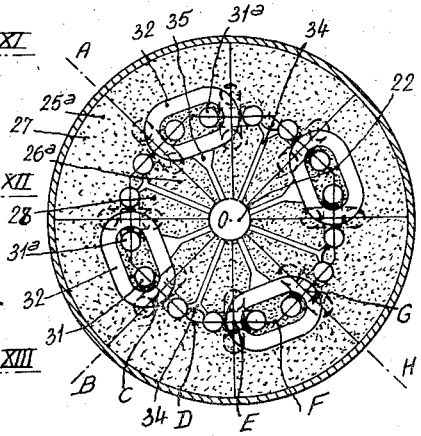
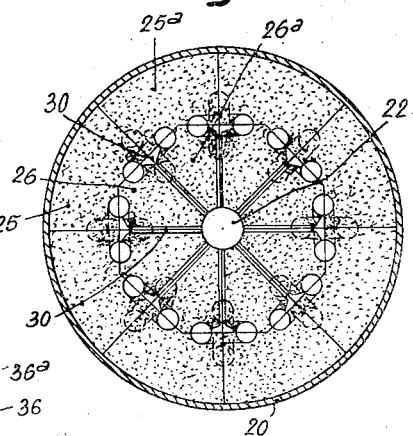
INVENTOR
ROBERT ANDRE MARCEL RONCERAY
By Linton and Linton ATTORNEYS Aug. 12, 1952  R. A. M. RONCERAY  2,606,348
MOLD FOR THE FABRICATION OF METALLIC CHAINS
Filed May 16, 1949  5 Sheets-Sheet 4

INVENTOR
ROBERT ANDRE MARCEL RONCERAY
By Linton and Linton
ATTORNEYS

Aug. 12, 1952     R. A. M. RONCERAY     2,606,348
MOLD FOR THE FABRICATION OF METALLIC CHAINS
Filed May 16, 1949                                5 Sheets-Sheet 5
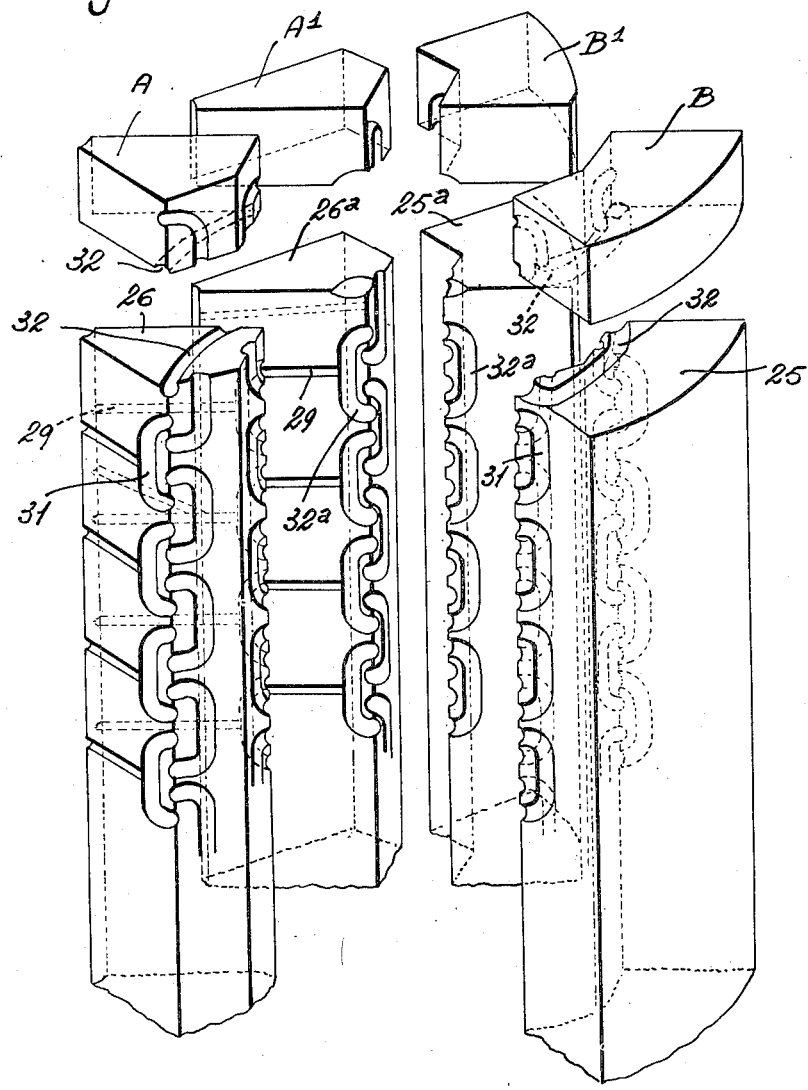
INVENTOR
ROBERT ANDRE MARCEL RONCERAY
By Linton and Linton
ATTORNEYS

Patented Aug. 12, 1952

2,606,348

UNITED STATES PATENT OFFICE 2,606,348

MOLD FOR THE FABRICATION OF METALLIC CHAINS

Robert André Marcel Ronceray, Thiais, France

Application May 16, 1949, Serial No. 93,625
In France September 22, 1948

3 Claims. (Cl. 22—132)

This invention relates to metallic chains and is concerned with a novel chain, a method for the fabrication of said novel chain, and equipment, more particularly molds, suitable for carrying out said method.

It is an object of this invention to produce, by casting, a novel metallic chain which shall be much stronger than the chains hitherto produced, because each of its links shall be of one continuous piece of metal and does not require welding during the production thereof, and which shall be particularly strong when made from very hard metals, such as nickel-chromium steel hitherto unemployable in the fabrication of metallic chains.

It is a further object of the invention to provide a method for the fabrication, by casting, of said novel chain, which consists substantially in arranging, in a mold, either along a helix or parallel to the generating lines of an imaginary cylinder, and around a central feed ingate, a series of consecutive mold cavities matching with the corresponding links of a chain to be obtained, said mold cavities being interconnected and individually connected, through appropriate feed channels, with said ingate, and introducing the molten metal into the ingate and from it, through said channels, into the mold cavities which are thus filled up and form the desired corresponding chain links hooked to one another and, after usual cleaning, freely movable about one another.

It is a still further object of this invention to provide equipment, namely molds and cores suitable for carrying out the above method.

Other objects of the present invention will be apparent from the following detailed description and appended claims.

The invention will be described with reference to the accompanying drawings in which are illustrated by way of example, some operative embodiments for carrying out the spirit of the invention which, however, is not restricted to such embodiments.

Fig. 1 is a fragmentary view, in elevation, showing a helix-like disposition of a chain in a mold according to the invention;

Fig. 2 is a fragmentary plan view corresponding to Fig. 1;

Fig. 3 is a fragmentary elevational view showing a modification in the arrangement set forth in Fig. 1;

Fig. 4 is a fragmentary plan view corresponding to Fig. 3;

Fig. 5 is a fragmentary elevational view showing a chain coiled on a cylinder;

Fig. 6 is a fragmentary plan view corresponding to Fig. 5;

Fig. 7 is likewise a fragmentary plan view showing a chain coiled on a cylinder, the chain links here being oriented differently;

Figs. 8 and 9 are fragmentary elevational views showing different arrangements of chain links such as they may come out of the molds;

Fig. 10 shows a vertical section of a mold according to the present invention taken on the lines A—O—C—D—E—F—G—H of Fig. 11;

Figure 14:
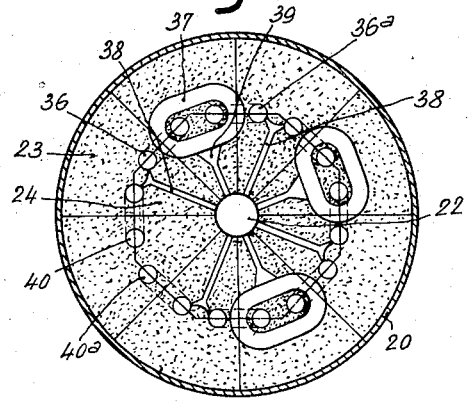
Figure 15:
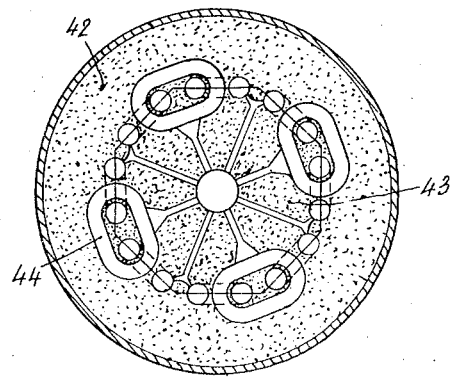

Figs. 11 to 14, inclusive, are cross-sectional views taken on the lines XI—XI, XII—XII, XIII—XIII and XIV—XIV, respectively of Fig. 10;

Fig. 15 is a modification in the arrangement shown in Fig. 14, and

Fig. 16 is a perspective view of four cores together with their respective top cores for forming each series of chain links.

Referring to the example shown in Figs. 1 and 2, it will be seen that, designated by reference 1, is a mold arranged coaxially with a central feed ingate 2. The mold cavities such as 3 and 3', each of which is intended for molding in it a chain link, are disposed one after another and, normally, are insulated from one another. Each of these mold cavities is connected with an annular space arranged around the central ingate 2, by means of side channels such as 4. The mold cavities are here disposed along a helix, and a certain space 5 is provided between the mold cavities 3 and 3' to insulate them, by sand, from each other. Said helix may have any desired pitch.

The mold may be formed by superimposed elementary cores corresponding each to a pitch of the helix and having feed channels and a corresponding portion of the central ingate 2. The chain is then obtained by casting, more particularly by centrifugal casting, the molten metal being introduced into the central ingate 2.

Instead of superimposing the elementary cores to form the mold, the molding may be effected by the "lost wax" method. This method is well known to those skilled in the art and, therefore, will not be described in detail. The material which serves to constitute the mold and separates the wax elements may be green sand, baked and containing burnt oil, or silica said whose grains are held together by a colloidal silica binder. These methods of molding are indicated merely by way of example, and the casting operation may be effected by any other known method.

Whatever may be the mode of casting, and owing to the space 5 provided between each two adjacent mold cavities, the resulting links are independent, but they come out of the mold hooked to one another.

Referring to the example shown in Figs. 3 and 4, it will be seen that the mold cavities, always disposed along a helix, are not in alignment with one another as in the case of Figs. 1 and 2, but they are alternated: one, 6, is vertical while the next one, 7, is substantially horizontal, so that the mold cavities are spaced closer to one another and their number along the given helix length is greater.

The mold cavities may be also disposed along lines parallel to the generating lines of a would-be cylinder coaxial with a central feed ingate situated in alignment with the axis of rotation of the centrifugal casting machine.

As this is shown in Figs. 5, 6 and 7, the mold cavities are arranged in the form of successive coils or rows 8, 9 and 10, alternately interconnected, at their lowermost and uppermost ends, by means of mold cavities such as 11 and 12, each mold cavity being connected with the central feed ingate 2 by a radial feed channel 4. There have been indicated, in Figs. 5, 6 and 7, the mold cavities of vertical row 8 oriented in the same sense as the mold cavity 8a shown in Fig. 5, and likewise for the mold cavities 8b. The same principle of graphical representation has been adopted for the mold cavities shown at 9a and 9b in Fig. 6, respectively following the direction of the links 9a and 9b shown in Fig. 5.

However, instead of disposing the links of successive rows in the planes not containing the theoretical axis of the mold, it may be possible, as shown in Fig. 7, to arrange the mold cavities in radial planes or planes perpendicular to these radial planes, it being understood that each mold cavity is always connected with the central ingate by means of a feed channel 4.

Obviously, the chain mold cavities may be disposed in any other manner to facilitate either the feeding or the molding and core work. Thus, shown in Figs. 8 and 9 are arrangements of successive mold cavities 13, 14, 15, 16 and 17, 18, 19 that may be utilized either in the form of coils, as in Fig. 5, or helically, as in Figs. 1 and 3.

Shown in Fig. 10 is a form of mold designed according to the invention. In a cylinder 20 forming the molding box is disposed the series of cores, whereby a complete mold is formed, and this mold is placed centrally upon the table 21 of a centrifugal casting machine.

In the example shown, the cores are each substantially wedge shaped and extended radially around a central feed ingate 22 with the tips thereof forming said ingate.

The contemplated core box is designed for molding chains according to the arrangements shown in Figs. 5 and 7, i. e. in the form of vertical rows parallel to the generating lines of a cylinder.

The length of chain to be molded is assumed to comprise eight vertical rows. Accordingly, the mold is composed of eight vertical sectors each of which has six cores: two lowermost cores 23 and 24, two intermediate vertical cores 25, 26 and two uppermost cores 27, 28 (Fig. 10).

These cores are assembled in juxtaposition with six cores arranged as a wedge with the latter cores being placed in the mold invertedly, i. e., having their heads turned down, with respect to the former. The third group of six cores is positioned similar to the first group, the fourth group similar that of the second one, and so on in an alternating manner.

Figure 13:
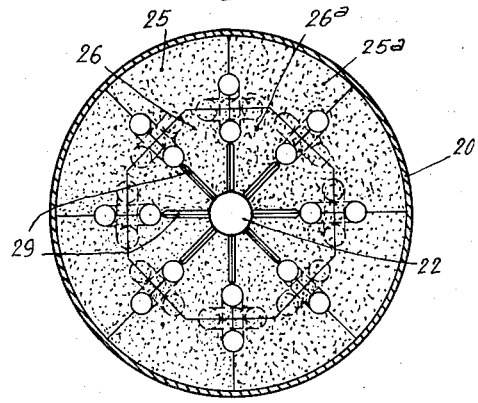

In this way, each row of the chain will be molded in the cavity formed by four successive cores 25, 26, 25a, 26a (Figs. 12, 13).

Each mold cavity corresponding to a link of the chain receives the molten metal from the central ingate through a feed channel such as 29 or 30, situated in the joint plane of vertical cores 25—26 and 25a—26a, etc.

The last uppermost mold cavity 31 of each vertical row of mold cavities is connected with the first mold cavity 31a of the next row through a horizontal mold cavity 32 (Figs. 10 and 11). These mold cavities are connected with a central ingate 22 through feed channels such as 34, 35 in the horizontal plane of junction of the cores (Figs. 10 and 11).

The last lowermost mold cavity 36 (Figs. 10 and 14) of each vertical row of mold cavities is connected with the first lowermost mold cavity 36a of the next row through a horizontal mold cavity 37.

These mold cavities are connected with the central ingate 22 through feed channels such as 38 and 39.

The first mold cavity 40 (Figs. 10 and 14) of the first vertical row and the last mold cavity 40a of the last vertical row are not interconnected; they are intended to form the two ends of the chain.

Topping the mold is a feed box 41 to feed the central ingate 22 into which are radially branched all of the feed channels individually feeding each mold cavity.

Should a longer chain be desired, there may be provided at the bottom of the mold, under the first row of cores, a box (not shown) including the number of mold cavities corresponding to the number of links to be added to the standard chain length so as to obtain the desired length.

In this case, the first link of this additional chain length is inserted into the lowermost cores of the mold and takes its place in the first mold cavity 40 of the first row of chain. At the time of casting, it will be incorporated as the first link in the new chain and hence it will be automatically added to the chain portion newly cast.

The cores 23 and 24 of the row of lowermost cores are, in this case, slightly different in the sense that they include the housing of the second link in the additional row already cast, which row comes beneath.

From the foregoing explanation with reference to the accompanying drawings, it will be seen that the design of the aforesaid mold necessitates, in principle, a core-box for the inner basic core elements 24, a box for the peripheral basic elements 23, a box for the inner intermediate elements 26 and one for the peripheral intermediate elements 25, a box for the inner uppermost elements 28 and one for the peripheral uppermost elements 27, a box for inner cores, and an outer box for the basic elements to serve for forming the head and tail of the chain.

It is also possible, according to Fig. 15, to use at each end of the mold a particular core in which the outer crown 42 is substituted for the eight peripheral cores 23 and a central core 43 is substituted for the eight inner cores 24, this arrangement being obtained with the aid of removable parts, pins etc.

Of course, when such cores are employed, it is necessary to plug one of the mold cavities, for example 44, in a manner to suppress a link, at the time of casting, so as to have an interruption, otherwise an endless chain would be obtained.

Finally, the various cores may be made from siliceous refractory materials, such as cement and silicic acid, pure or alloyed magnesia, aluminium silicate, zirconium or any other high temperature-resisting material. They may be employed such as they are after baking, or coated with an insulating material, colloidal silicic acid, magnesia or the like, which materials may be pasty, liquid or powdered, applied by pencilling, pulverizing, soaking or the like, without departing from the scope of the invention.

What I claim is:

1. A mold for molding at one time chains having continuous intercoupled freely movable links comprising an elongated core box, an annular contiguous series of inner cores with each core being substantially wedge shaped and extending vertically with the tip of the wedge positioned at the center of said series, an annular series of outer cores being positioned within said box and surrounding said inner series of cores with a face of each of said inner cores being in contact with a face of one of said series of outer cores, each of said inner and outer cores contacting the adjacent cores and having longitudinally extending series of spaced partial link molding cavities formed in the adjacent core contacting faces thereof at the edges where the inner and outer cores join, said cores being positioned with the link cavities of each core coinciding with the cavities of adjacent cores forming whole link molding cavities for a strand of chain links, said inner cores having a longitudinally extending central feed ingate formed therein, said inner cores having feed channels formed therein from said feed ingate to said molding cavities formed therein and additional cores mounted on the tops and bottoms of said inner and outer cores having partial link molding cavities cooperating with the cavities in said inner and outer cores for forming connecting links between each pair of said strands of links.

2. A mold for molding at one time chains having continuous intercoupled freely movable links comprising an elongated core box, an annual series of inner cores with the adjacent faces thereof contacting one another, an annular series of outer cores surrounding said inner cores and the adjacent faces of said outer cores contacting one another, said inner and outer cores being positioned within and extending longitudinally of said core box and each inner core having a face thereof contacting a face of one of said outer cores, each inner core and its contacting outer core forming substantially a wedge with the tip thereof positioned at the center of said inner series of cores, each core having a series of spaced intercoupled partial link molding cavities with each series extending longitudinally along and from the edge of said core where the inner and outer cores join with said cavities being positioned alternately on one face and then the other of the faces of said core extending from said edge, said inner and outer cores being positioned with the cavities of adjacent cores coinciding and forming a series of link molds between each pair of said wedges, said inner cores having a longitudinally extending central feed ingate formed therein, said inner cores having feed channels formed therein from said feed ingate to said molding cavities formed therein and additional cores mounted on the tops and bottoms of said inner and outer cores having partial link molding cavities cooperating with cavities in said inner and outer cores for forming connecting links between each pair of said strands of links.

3. A mold for molding at one time chains having continuous intercoupled freely movable links comprising an elongated core box, an annular series of superimposed bottom, intermediate, and top inner cores with the adjacent faces thereof contacting one another, an annular series of superimposed bottom, intermediate and top outer cores surrounding said inner cores and the adjacent faces of said outer cores contacting one another, said inner and outer cores being positioned within and extending longitudinally of said core box and each inner core having a face thereof contacting a face of one of said outer cores, each inner core and its contacting outer core forming substantially a wedge with the tip thereof at the center of said inner series of cores, each intermediate core having a series of spaced intercoupled partial link molding cavities with each series extending longitudinally along and from the edge of said core where the inner and outer cores join with said cavities being positioned alternately on one face and then the other of the faces of said core extending from said edge, said inner and outer intermediate cores being positioned with the cavities of adjacent cores coinciding and forming a series of link molds between each pair of said wedges, said top and bottom cores having partial link molding cavities formed therein for forming a link mold with the cavities of adjacent cores, said top and intermediate cores having partial link molding cavities formed in their contacting faces providing molds for forming links connecting the links of each pair of said series of link molds at the top thereof, said bottom and intermediate cores having partial link molding cavities formed in their contacting faces providing molds for forming links connecting the links of each pair of said series of link molds at the bottom thereof and said inner cores having passages provided therein between the cavities thereof for the passage of molten metal thereto.

ROBERT ANDRÉ MARCEL RONCERAY.

REFERENCES CITED

The following references are of record in the file of this patent:

UNITED STATES PATENTS

| Number | Name | Date |
|---|---|---|
| 703,170 | Baldt | June 24, 1902 |
| 1,656,731 | Fawcett | Jan. 17, 1928 |
| 1,993,655 | Floyd | Mar. 5, 1935 |
| 2,388,986 | Morin | Nov. 13, 1945 |
| 2,400,831 | Kohl | May 21, 1946 |